O. HEINS, C. M. WILD AND W. E. SCHWARZMANN.
ELECTRICAL CONDENSER AND MOUNTING THEREFOR.
APPLICATION FILED FEB. 11, 1918.
1,312,983.
Patented Aug. 12, 1919.
2 SHEETS—SHEET 1.
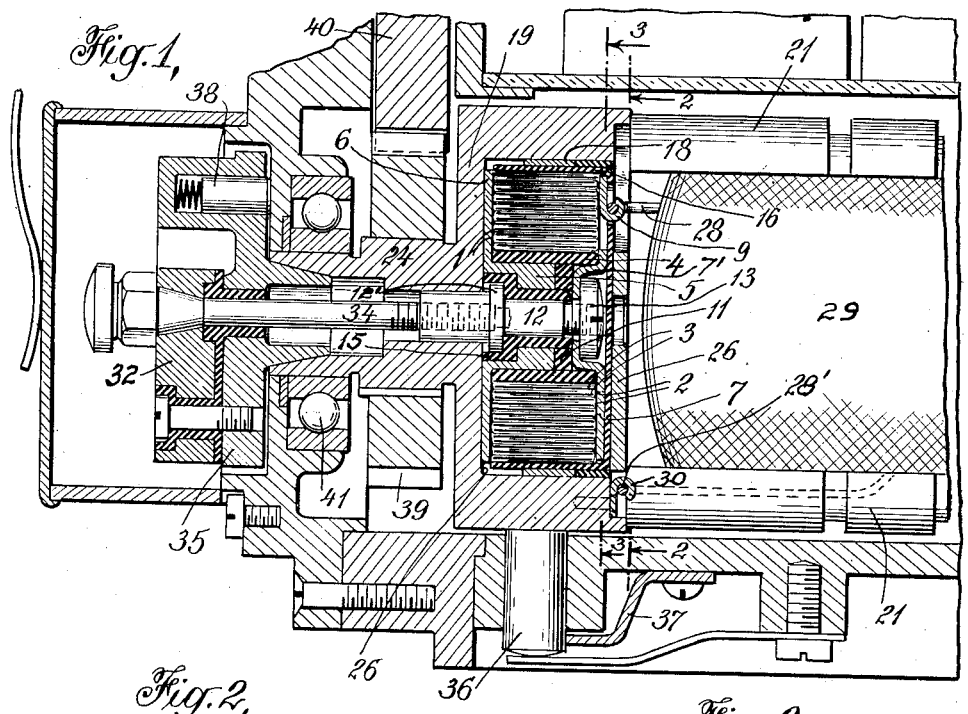
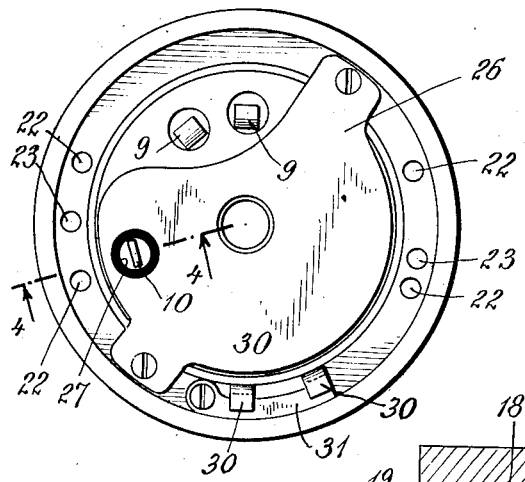
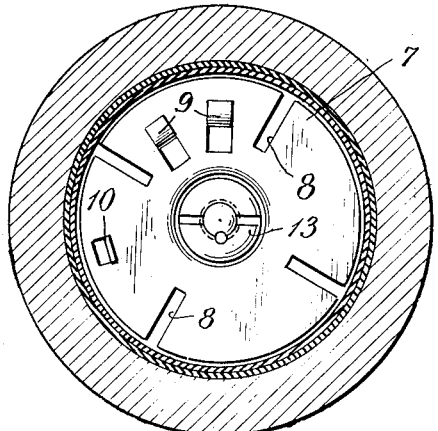
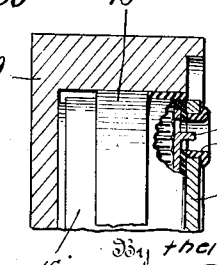
Inventors
Otto Heins,
Charles M. Wild
& Wolfgang E. Schwarzmann
By their Attorneys

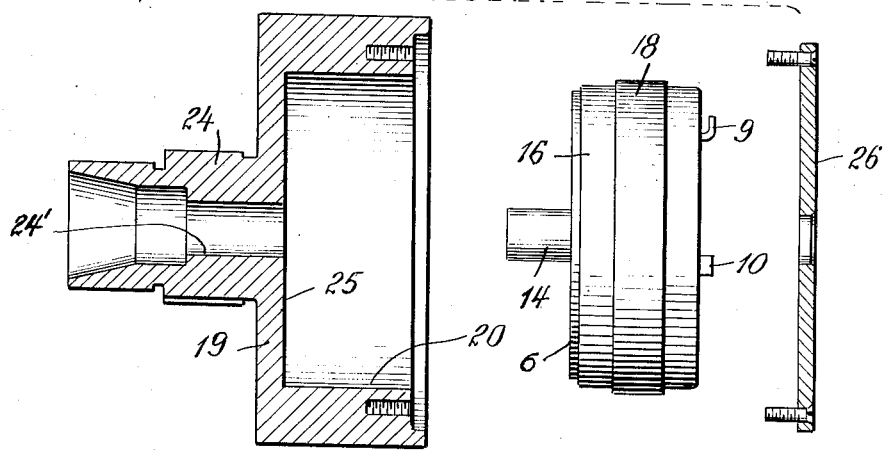
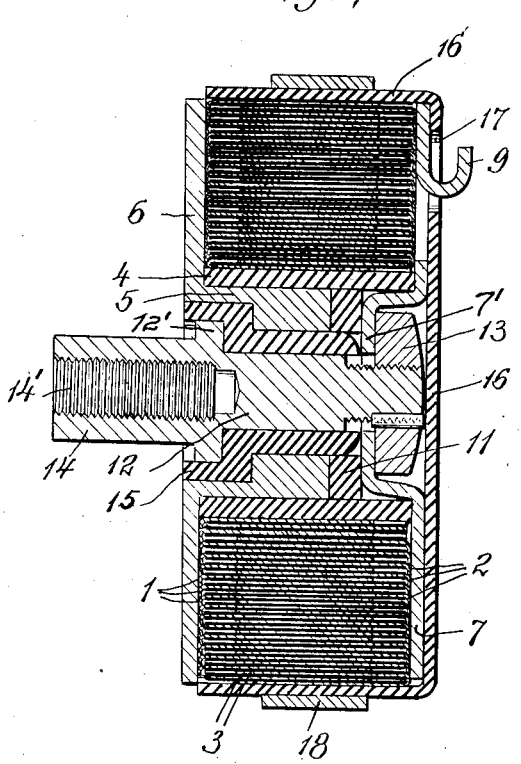
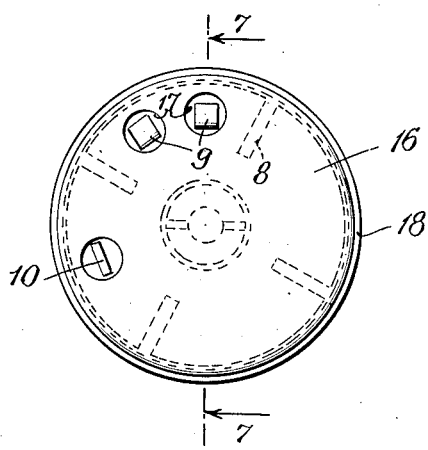
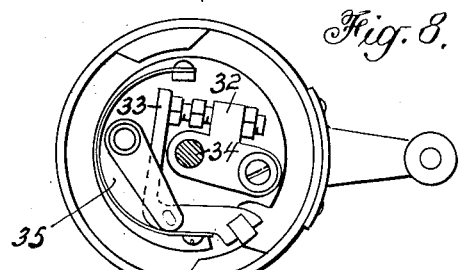

UNITED STATES PATENT OFFICE.

OTTO HEINS AND CHARLES M. WILD, OF SOUTHWICK, AND WOLFGANG E. SCHWARZMANN, OF SPRINGFIELD, MASSACHUSETTS, ASSIGNORS, BY MESNE ASSIGNMENTS, TO AMERICAN BOSCH MAGNETO CORPORATION, OF NEW YORK, N. Y., A CORPORATION OF NEW YORK.

ELECTRICAL CONDENSER AND MOUNTING THEREFOR.

1,312,983.   Specification of Letters Patent.   Patented Aug. 12, 1919.

Application filed February 11, 1918. Serial No. 216,491.

*To all whom it may concern:*

Be it known that we, OTTO HEINS, subject of the German Emperor, CHARLES M. WILD, subject of the German Emperor, and WOLFGANG E. SCHWARZMANN, citizen of the United States, residing at and whose post-office addresses are, respectively, Southwick, Massachusetts, Southwick, Massachusetts, and 51 Bellclaire avenue, Long Meadow, Springfield, Massachusetts, all in the county of Hampden and State of Massachusetts, have invented certain new and useful Improvements in Electrical Condensers and Mountings Therefor; and we do hereby declare the following to be a full, clear, and exact description of the invention, such as will enable others skilled in the art to which it appertains to make and use the same.

The electrostatic capacity of a condenser depends, among other things, upon the separation of the conductor plates or bands. Thus, where a large capacity per unit volume is essential, the layers formed by the plates or bands must be placed and maintained as close as possible, notwithstanding their tendency to loosen or separate, especially when subjected to centrifugal force in rotating with the armature of a magneto electric machine, or other device.

However, when the capacity does decrease materially from any cause whatsoever, or when the dielectric is punctured, the condenser should be replaced in its mounting. This may be facilitated, and the condensers handled and shipped with less hazard, by providing a unitary condenser structure capable of being readily installed in and removed from its mounting without material likelihood of improper electrical connections therein.

In accordance with this invention, the electrostatic capacity per unit volume is increased, and its high value better maintained, by providing a condenser in which a retaining ring or band, of suitable shape, tightly holds the plates or bands against loosening or separation. Preferably, the condenser for this purpose is round and of the coil or wound type having adjacent bands of foil projecting laterally on the respective sides of the interposed bands of dielectric, to form continuous side contact terminals for the condenser. In the preferred embodiment hereinafter described, a metal retaining ring is shrunk around the outer periphery of an insulating cap which closely fits around the condenser. The outer periphery of this insulating cap is coated with heat resisting material to withstand the temperature to which the retaining ring is heated before shrinking, and the core onto which the condenser is mounted is non-collapsible so as to resist the radial pressure of the contracted ring. An exposed terminal plate contacts with one side of the condenser, and another terminal plate contacts with the other side thereof, the two plates being held in place by the condenser core. In this construction, the retaining ring not only holds the condenser bands tightly against loosening or separation, even when subjected to centrifugal action, but it also serves to form a unitary condenser structure comprising the condenser, its core, and the two terminal plates, one exposed and the other connected to the core but covered by the insulating cap with connecting clips extending therethrough.

In installing this unitary condenser structure in its mounting, a holding plate, fastened to the mounting to hold the condenser therein, may be provided with means coacting with a projection carried by one terminal plate to prevent circumferential movement of the condenser unit in the mounting.

Such a condenser structure and mounting may be combined with a magneto electric machine, the condenser suppressing the sparks tending to form between the interrupter elements upon interruption of the generating winding. In such application, a stud may extend from the insulated interrupter element to the screw threaded core of the condenser, thereby electrically connecting one terminal plate of the condenser with an interrupter element, and drawing the other terminal plate into intimate contact with the condenser mounting to ground it thereon. Then by fastening the insulated terminal of the generating winding in the clips carried by one terminal plate of the condenser, and connecting the other terminal of the generating winding to clips fastened to the condenser mounting, the entire connection of the condenser to the generating winding and the interrupter is completed.

In the accompanying drawings illustrating the preferred embodiment of the condenser and the mounting therefor, applied, as an example, to a magneto electric machine, Figure 1 is a longitudinal section of the mechanical interrupter, the condenser and a part of the magneto armature, the condenser being shown, as an example, of the round coil type having side terminals; Figs. 2 and 3 are sections on lines 2—2 and 3—3, respectively, of Fig. 1; Fig. 4 is a detail, particularly showing the means for preventing circumferential movement of the condenser in its mounting; Fig. 5 is a view, partly in section, showing the condenser unit and the associated parts of the mounting therefor; Fig. 6 is a side elevation of the condenser unit; Fig. 7 is an enlarged section of the condenser unit; and Fig. 8 is a front view of the mechanical interrupter with the cover removed.

The condenser unit comprises the round condenser formed from continuous bands 1 and 2 of conducting material, such as aluminum foil, and separated by continuous bands 3 of dielectric, such as paraffined paper. The bands 1 of foil project laterally on one side of the bands of dielectric, and the bands 2 of foil project laterally on the other side of the bands of dielectric. When turned over, the projecting portions of the bands of foil form continuous side terminals for the condenser.

The condenser, wound on a fiber core 4, is slipped onto the hub 5 of the side terminal plate 6. The other side terminal plate 7 has radial slots 8 to provide increased resiliency, and also has two connector clips 9 and a projection 10 struck up from the metal thereof. The two terminal plates are insulated from each other by the insulating ring 11. The metal core 12 is provided with a nut 13 locked in position, and also with an extension 14 having a screw threaded bore at 14'. The nut 13 sets in a central depression 7' of the terminal plate 7 in electrical contact therewith, but is insulated by the fiber bushing 15 from the other terminal plate 6.

A fiber cap 16, having holes 17 for the clips 9 and the projection 10, fits closely around the outer periphery of the condenser, and closely against the outside face of the terminal plate 7 to cover it.

A comparatively narrow retaining ring 18 is shrunk around the outer periphery of the cap 16 by heating it to a cherry red temperature, forcing it around the core, and allowing it to cool thereon, the outer periphery of the cap being coated with bakelite or other heat insulating material to protect the cap and condenser against the high temperature of the heated ring. The retaining ring, shrunk in place in this way, grips the cap in binding engagement and tightly holds the bands of the condenser against loosening, even when subjected to centrifugal action resulting from rotation at high speed. It will be observed that the terminal plates 6 and 7 and the cap 16, held in place by the retaining ring 18 and core 12, form a unitary condenser structure wherein the condenser is almost entirely inclosed in substantially moisture-proof manner. The condenser core 12 is non-collapsible against radial pressure exerted on the condenser by the retaining ring 18, when contracted, and is maintained in position within the condenser by the nut 13 on one end and the shoulder 12' on the other end.

The condenser mounting comprises a cup-shaped metal member 19 for reception of the condenser unit. This mounting is rigidly secured to the armature poles 21 of the magneto by screws passing through the holes 22 and dowel pins entering the holes 23. The hub 24 of the mounting is bored at 24' for the extension of the core 12 of the condenser unit, and provides an end wall at 25 for contact with the outer surface of the exposed terminal plate 6.

After the condenser unit is mounted in the member 19, the holding plate 26 is fastened to the mounting in such position that the projection 10 extends into the bushed hole 27 to prevent relative circumferential movement of the unit in the mounting. The insulated terminal 28 of the generating winding 29 is fastened in the clips 9 and the terminal 28' of the generating winding is fastened in the clips 30 of the connecting piece 31 screwed to the mounting.

The mechanical interrupter includes an insulated element 32, and a grounded element 33. The insulated element is electrically connected to the insulated terminal plate 7 of the condenser unit by a stud 34 having screw-threaded engagement with the core 12, so as to pull on the extension of the core. Upon fastening the stud in place, the terminal plate 6 is clamped between the end wall 25 of the cup-shaped member 19 and one condenser terminal, whereas the other terminal plate 7 is clamped between the nut 13 and the other condenser terminal. Furthermore, the stud holds the rotatable interrupter disk 35 firmly in position.

The grounded terminal 28' of the generating winding 29, and also the exposed terminal plate 6 of the condenser unit are connected to the stationary frame of the magneto by the spring-pressed brush 36 which engages the outer periphery of the member 19 and which is electrically connected to the frame by the conductor 37 fastened to the brush and secured to the frame. The grounded interrupter element 33 is electrically connected to the stationary frame of the magneto by the spring-pressed brush 38 sliding in contact with a stationary part of the interrupter housing.

The gear 39 is keyed on the hub 24 of the condenser mounting in mesh with the gear 40 mounted on the distributer shaft for rotating the distributer brush of the magneto. The end of the armature shown at the left of Fig. 1 is supported for rotation in the bearing 41.

Having thus described our invention, what we claim is:

1. A condenser having a shrunken metal ring tightly fitting around its outer periphery to prevent loosening of the layers thereof.

2. A condenser having a shrunken metal ring insulated therefrom and tightly fitting around the outer periphery of the condenser to prevent loosening of the layers thereof.

3. A round condenser having a shrunken metal ring in binding engagement with its outer periphery to prevent loosening of the layers thereof.

4. A coil condenser having side terminals and a shrunken metal ring, of lesser width than the condenser, tightly fitting around its outer periphery to prevent loosening of the bands thereof.

5. A coil condenser having a non-collapsible core, and a shrunken metal ring tightly clamping the bands around the core to prevent loosening of the bands of the condenser.

6. A condenser having an insulated cap closely fitting around its outer periphery, and a shrunken metal band in binding engagement with the cap to prevent loosening of the layers of the condenser.

7. A condenser having an insulated cap closely fitting around the outer periphery of the condenser and having its outer periphery coated with heat insulating material, and a shrunken metal ring tightly fitting around the coated periphery of the cap to prevent loosening of the layers of the condenser.

8. A unitary condenser structure comprising a condenser having a core and side terminals, terminal plates contacting with the respective terminals of the condenser, an insulating cap fitting around the periphery of the condenser and over one terminal plate, and a retaining ring fitting around the outer periphery of the insulating cap, the exposed terminal plate being held in place by the core, whereby the condenser structure may be readily installed in ignition apparatus and the like with the exposed terminal plate in contact therewith.

9. A unitary condenser structure comprising an annular condenser having side terminals, terminal plates contacting with the respective terminals of the condenser, an insulating cap fitting around the periphery of the condenser and over one terminal plate, a metal core electrically connected to one terminal plate and insulated from the other one but holding it in place, and a retaining ring fitting around the outer periphery of the insulating cap, whereby the condenser structure may be readily installed in ignition apparatus and the like with the exposed terminal plate in contact therewith.

10. A unitary condenser structure comprising an annular condenser having side terminals, a terminal plate contacting with one terminal of the condenser, a second terminal plate contacting with the other terminal of the condenser and having a central depression, a metal core having an enlarged head arranged in the depression in contact with that terminal plate and being insulated from the other terminal plate but holding it in place, an insulating cap fitting around the outer periphery of the condenser and over said second terminal plate, and a retaining ring fitting around the outer periphery of the insulating cap, whereby the condenser structure may be readily installed in ignition apparatus and the like with the exposed terminal plate in contact therewith.

11. A unitary condenser structure comprising an annular condenser having side terminals, a terminal plate contacting with one terminal of the condenser, a second terminal plate contacting with the other terminal of the condenser, a metal core maintained in position within the condenser in contact with one terminal plate but insulated from the other and holding it in place, an insulating cap fitting around the outer periphery of the condenser and over one terminal plate, and a retaining ring fitting around the outer periphery of the insulating cap.

12. A unitary condenser structure comprising a condenser having side terminals, terminal plates contacting with the respective terminals of the condenser, an insulating cap fitting around the periphery of the condenser and over one terminal plate, and a retaining ring fitting around the outer periphery of the insulating cap, the terminal plate covered by the insulating cap carrying a connector passing therethrough, whereby the condenser structure may be readily installed in ignition apparatus and the like with the exposed terminal plate in contact therewith.

13. The combination of a round condenser unit, a mounting having a cup-shaped member for the reception of the unit, and means for preventing circumferential movement of the unit in the mounting.

14. The combination of a round condenser unit carrying a projection, a mounting having a cup-shaped member for the reception of the condenser, and a holding plate fastened to the mounting to hold the unit within the mounting, the holding plate having means coacting with the projection to prevent circumferential movement of the condenser in the mounting.

15. The combination of a round condenser unit having one side terminal plate exposed and another side terminal plate covered by insulating material, a mounting having a cup-shaped member with its end wall contacting with the exposed terminal plate of the unit, and a holding plate fastened to the mounting in proximity to the covered terminal plate to hold the unit within the mounting, the covered terminal plate having a projection extending into coöperation with the holding plate to prevent circumferential movement of the unit in the mounting.

16. The combination of a condenser unit having side terminal plates insulated from each other and contacting with respective terminals of the condenser, a condenser-mounting having a cup-shaped member for the reception of the condenser unit, and connectors electrically connected to the respective terminal plates.

17. The combination of a condenser unit having one side terminal plate exposed and a second side terminal plate insulated from the first, a metal condenser-mounting having a cup-shaped member with its end wall in contact with the exposed terminal plate, a connector extending from the second terminal plate, and a connector fastened to the mounting.

18. The combination of a condenser unit having one side terminal plate exposed and a second side terminal plate insulated from the first, a metal core contacting with the second terminal plate but insulated from the first, a metal condenser-mounting having a cup-shaped member with its end wall in contact with the exposed terminal plate, a connector extending from the terminal plate that is connected to the core, and another connector fastened to the mounting.

19. The combination of an annular condenser having side terminals, an exposed terminal plate on one side of the condenser, a second terminal plate on the other side of the condenser, a metal core having an enlarged head on the outside of said second terminal plate and an extension passing through the condenser, and a mounting having a cup-shaped member for the reception of the condenser, the construction and arrangement being such that by pulling on the extension of the core the exposed terminal contact is clamped between the end wall of the cup-shaped member and one condenser terminal, whereas the other terminal plate is clamped between the enlarged head of the core and the other condenser terminal.

In testimony whereof, we affix herewith our signatures.

OTTO HEINS.
CHARLES M. WILD.
WOLFGANG E. SCHWARZMANN.